April 10, 1934.  S. ELIOT  1,954,408
COMPRESSED AIR ENGINE
Filed Jan. 21, 1932  2 Sheets-Sheet 1
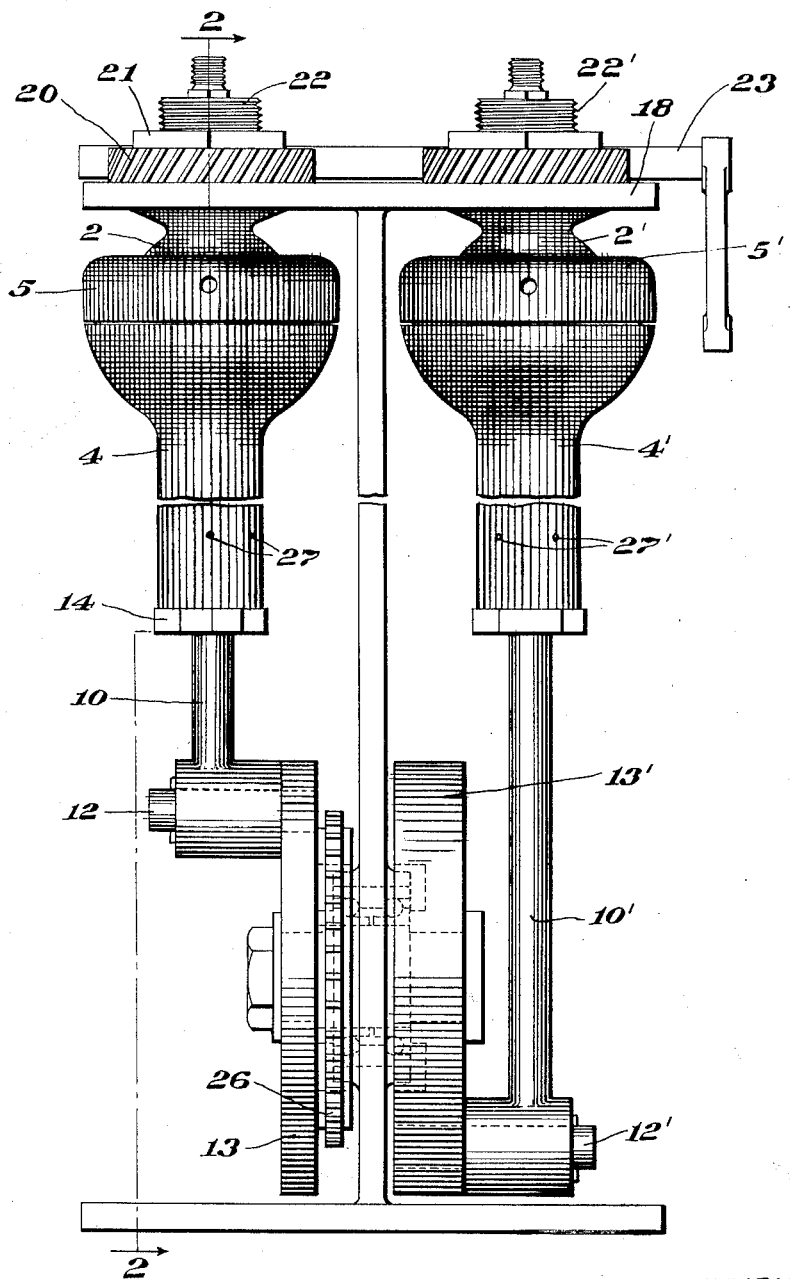
INVENTOR
Samuel Eliot

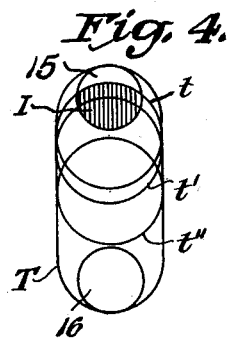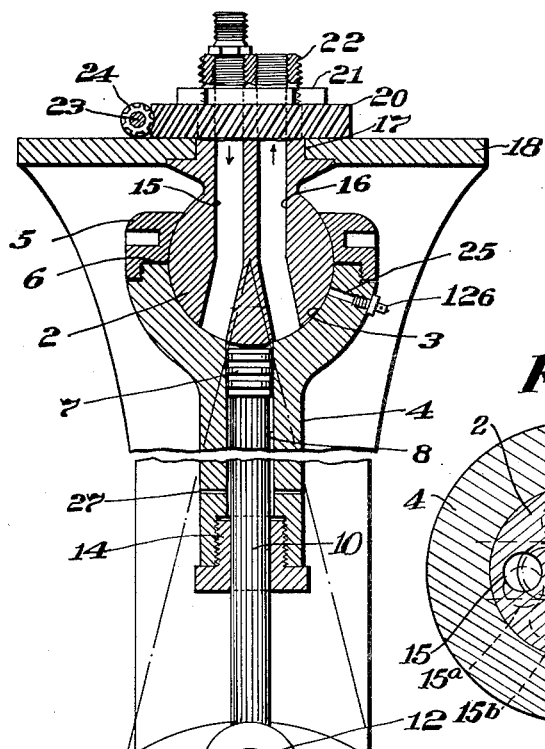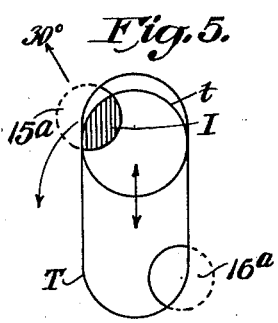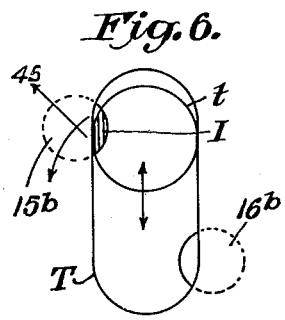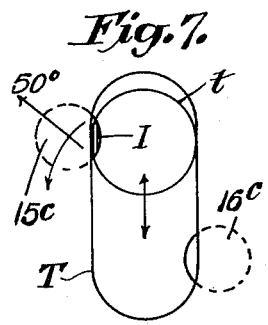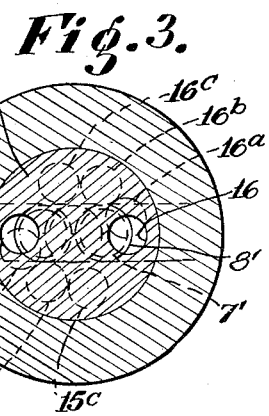

Patented Apr. 10, 1934

1,954,408

UNITED STATES PATENT OFFICE 1,954,408

COMPRESSED AIR ENGINE

Samuel Eliot, Newton, Mass.

Application January 21, 1932, Serial No. 587,893

6 Claims. (Cl. 121—65)

This invention relates to engines designed especially to be operated by compressed air, although capable, also, of being actuated by steam and other fluids.

It is the chief object of the invention to simplify the construction of engines of this general type and to devise an engine which will develop relatively high power even in small units, while still being economical in operation, flexible, easy to control, and of exceptionally reliable and simple construction.

The nature of the invention will be readily understood from the following description when read in connection with the accompanying drawings, and the novel features will be particularly pointed out in the appended claims.

In the drawings,

Figure 1 is a side elevation of a two cylinder compressed air engine constructed in accordance with this invention;

Fig. 2 is a view, partly in end elevation and partly in vertical section, of the engine shown in Fig. 1;

Fig. 3 is a horizontal, sectional view through the supporting ball 2, the view being somewhat diagrammatic in character; and Figs. 4 to 7 inclusive, are diagrammatic views illustrating the operation of the engine in various adjusted positions thereof.

Referring first to Fig. 2, the construction there shown comprises a ball-shaped bearing member 2 which normally is held in a stationary position. The ball fits in a socket 3 formed in the upper end or head of a cylinder block 4, said head being split transversely to provide a removable section 5 which is screw threaded to the main cylinder block 4. Spacing shims or a packing 6 are inserted between the parts 4 and 5, partly for the purpose of preventing leakage around the ball, and partly, also, to permit the adjustment of the cylinder head to the ball so that a good running fit may be provided. A piston 7 runs in the cylinder 8 formed in the cylinder block 4, this piston preferably, but not necessarily, being integral with the piston rod 10, and the latter being connected to a crank pin 12 projecting eccentrically from a disk 13 which is rotatably mounted in the machine frame. The piston rod is guided partly by the engagement of the piston 7 with the cylinder, and partly by the lateral engagement of the rod with a bearing bushing 14 which is threaded into the lower end of the cylinder block.

It will be observed that in this construction the cylinder block is supported by the ball 2 and the piston 7. Also, that the axis of the cylinder 8 intersects the center of the ball 2. Consequently, when the engine is driving the disk 13, the cylinder will oscillate with the piston rod while the ball 2 remains stationary. This fact is utilized to control the admission and exhaust of the compressed air to the cylinder. For this purpose inlet and exhaust passages 15 and 16, respectively, are formed through the ball 2 and open on to the bearing surfaces of the ball and socket at diametrically opposite sides of the cylinder 8 when this cylinder is in its dead center position. Preferably the ports formed by the ends of these passages are spaced apart by a distance substantially equal to the diameter of the cylinder. Consequently, when the engine is running in the direction indicated by the arrow in Fig. 2, the inlet port will be opened immediately after the piston has passed its top dead center position. Compressed air will then enter the cylinder and force the piston downwardly, and the admission of compressed air will be cut off approximately at the instant that the piston reaches its lower dead center position. An instant later the exhaust port will be opened, the piston will begin to rise, and the air in the cylinder will be forced out through the exhaust passage 16, this port being closed again an instant before the piston reaches its top dead center position. These operations will be repeated in each revolution of the crank pin 12.

It will be seen from an inspection of Fig. 2 that if the ball 2 were rotated about the axis of the cylinder 8, the point in the movement of the piston at which the intake and exhaust ports would be opened and closed would be changed. Also, that if the ball were rotated through an angle of 180°, the engine then would be reversed. Provision is made in the construction shown for such adjustment of the ball, this member being provided with a cylindrical shank portion 17 which projects through a hole formed in the upper plate section 18 of the engine frame. Said shank is shouldered immediately above the plate 18 and a worm gear 20 is clamped securely on the shoulder by means of a nut 21 which is screwed on to a threaded extension 22 of the shank. An adjusting shaft 23 carries a worm 24 meshing with the worm wheel 20, so that by rotating the shaft 23 the ball 2 may be rotated about the axis of the cylinder into any desired position of adjustment and held in that position. Such adjustment may be utilized for throttling purposes, to change the cut-off, and to reverse the engine.

This will be clear from an inspection of Figs. 2 and 3, the latter figure showing, in plan, the relationship between the intake and exhaust ports 15 and 16, respectively, with reference to the path of travel of the upper end of the cylinder 8. This path is designated by the approximately elliptical area 8' which is shown partly in dotted lines and partly in full lines. It will be evident that normally during the swing of the cylinder block 4 air under pressure is admitted to the cylinder 8 when the edge of this cylinder slides to the left, Fig. 3, beyond the edge of the intake port 15. As the swing of the cylinder continues toward the left this port is opened to a certain maximum, after which the cylinder begins to swing toward the right and begins to close the port 15. The piston completes its down stroke while the cylinder is closed and starts on its upward stroke, but during the latter stroke it still swings toward the right and, after a very short period of rise, it opens the exhaust port 16, thus releasing the air held in the cylinder. It will be observed from Figs. 2 and 3 that the diameter of the cylinder and piston is only slightly smaller than the distance between the inlet and exhaust ports 15 and 16 and that these ports, during the adjustment of the ball 2 relative to the member 4, will be rotated around the circumferential top dead center position of the cylinder and piston in almost a tangential relation thereto.

It will also be seen that if the ball 2, which normally is stationary, is adjusted around the axis of the cylinder into the piston necessary to move the intake and exhaust ports into the positions indicated at 15a and 16a, respectively, the length of the period during which these ports remain open will be shortened somewhat, and the areas of these ports which overlap the path of the upper end of the cylinder and which, therefore, are effective in providing for the flow of air into and out of the cylinder, will be reduced. In other words, the flow of air will be throttled somewhat.

If the ball 2 is adjusted still further around the axis of the cylinder so that its intake and exhaust ports are moved into the positions illustrated in Fig. 3 at 15b and 16b, respectively, then the period during which either port is open to the cylinder during each revolution of the engine will be very brief indeed. Also, the area of each port where it overlaps the path of travel of the cylinder will be very small so that the flow of air into the cylinder will be greatly throttled. This will materially reduce the speed of the engine, as will be obvious.

If, now, the ball is adjusted even further, so that the ports 15 and 16 do not communicate or open into the cylinder at any point in the swing of the cylinder block, then the engine will stop. This action will occur before the plane of the ports arrives in a position at right angles to the plane of the swing of the cylinder block. If, in addition, the rotative adjusting movement of the ball 2 is made even greater, so that the intake port is carried around substantially beyond the dead center position, then the direction of rotation of the engine obviously will be reversed.

This throttling effect may be more clearly understood by reference to Figs. 4, 5, 6 and 7. In Fig. 4 the path through which the cylinder bore oscillates during the pendulum-like movement of the engine cylinder is shown at T, and several intermediate positions of the cylinder bore are illustrated at t, t' and t'', the relation of the cylinder bore being at all times illustrated with respect to the inlet bore 15 and the exhaust bore 16. In Fig. 4 the adjusted position of the ball 2 is that shown in Fig. 2, and the maximum registration between the inlet 15 and exhaust 16 with the cylinder bore will be obtained.

In Fig. 5 the ball 2 has been adjusted to a 30° angularity with respect to the oscillatory path of travel of the cylinder and piston; in Fig. 6 there is shown a position of adjustment of 45°; and in Fig. 7 a still further adjustment to 50° is illustrated.

For the sake of comparison between the several figures, an intermediate position corresponding to the position attained when the crank has reached approximately 60° from dead center is illustrated, the shaded portion I illustrating the registration between the inlet bore and the cylinder bore at the position t of the piston and crank.

When the ball containing the inlet and exhaust conduits is revolved 30° (Fig. 5) from the position shown in Fig. 4 and the piston has descended from the top of its stroke to the position t, there will be a registration I, the maximum amount thereof being less than that which would be obtained had the ball not been revolved to a 30° angularity. Of course, this opening will diminish as the crank assumes positions t', t'', during the normal cycle, this being true regardless of the angular position of the ball, it being understood that the ball remains stationary at its angular setting. By still further throttling or turning the ball to a 45° angle (Fig. 6) there is a still smaller registration, and when the position of the cylinder orifice is at 50° (Fig. 7) the registration is still further diminished. This can be continued until there is no registration between the cylinder bore and the inlet at any position of crank angularity.

Exactly the same thing will happen with the exhaust openings at the different settings, the result being that there is no sealed air, steam or gas, except for the moments allowed for expansion, and the same orifice size as the intake will be found in the exhaust for any single adjustment of the ball 2.

If the adjustment is carried beyond the 90° position, then the throttling would begin in reverse.

It will be evident that the maximum opening or registration of any given setting will be at the time the cylinder bore is at the extreme end of its swing in these figures, and that the several positions, t, t', t'' are but illustrative of the many positions which will be assumed as the crank and piston pass through the cycle.

The whole throttling action is dependent on two things only, remembering that the oscillation of the cylinder is always in one direction only during the intake stroke. At full throttle (Fig. 4) the intake port opens almost directly after top dead center, and continues to open, and is wide open at half the stroke. It then starts to close and is completely closed at bottom dead center. Just after this the exhaust begins to open, and is wide open on the return stroke at the half mark, or 90°, but then begins to close as the piston approaches top dead center. As the ball is revolved to different adjusted settings, the intake opening, instead of being round, assumed a somewhat elliptical shape, and consequently, the maximum opening will be approached after the piston has traveled a portion of its stroke from upper dead center, the amount of piston travel required to produce a maximum inletting being greater in direct relation to the angular setting of the ball and the closing of the intake being effected earlier, that is, a greater distance from bottom dead center than would be the case in the maximum adjustment shown in Fig. 4. This makes for economy in operation.

The bearing surfaces of the ball 2 and socket require lubrication, and grease, or any other desired lubricant, may be forced on to these surfaces through the passage 25 which is equipped with an Alemite fitting 126. Lubricant introduced through this passage is distributed over the entire bearing surface of the ball and some of it finds its way into the cylinder where it lubricates the cylinder walls and the bushing 14.

It should be noted that the ball 2 serves a multiplicity of purposes. It acts as a thrust bearing, as a wrist pin, and in conjunction with the walls of the socket it forms both intake and exhaust valves, a throttle valve, and a reverse gear.

In the drawings the engine is shown as of the marine or upright type, but it will be understood that it can be operated equally as well horizontally, or in any other position. Fig. 1 shows a two cylinder engine, one unit being a duplicate of the other, but the two being connected to the crank shaft at nearly diametrically opposite points, as is the usual practice. Preferably the disks 13—13' of the two units are mounted on a shaft which is supported in the frame on ball bearings, and one of the disks carries a gear or sprocket wheel 26 by means of which the engine may be conveniently connected to the machine or apparatus which it is to drive. Small holes 27 should be drilled through the walls of the cylinder blocks into the cylinder or through the bushing 14, to permit the entrance of air to the cylinders and its escape from behind the pistons as the pistons move up and down. Duplicate parts illustrated in Fig. 1 are designated with primed numerals.

The invention thus provides an exceptionally simple engine construction of only three moving parts which is extremely sturdy and which, by using compressed air at high pressures, will develop relatively high horse powers even in small units. The invention is applicable to steam engines as well as to those designed to be operated by compressed air and other elastic fluids. The engine can be manufactured very economically, it requires relatively little care or attention, it is extremely flexible, economical, is easily controlled, and can easily be repaired, if that becomes necessary. It should be noted that the cylinder block is free to rotate around its own axis while the engine is running and a slow rotation does occur. This is of advantage in distributing the wear uniformly over the bearing surfaces of the ball and socket. Wear may be taken up by adjusting the part 5 to grip the ball to just the desired degree.

Having thus described my invention, what I desire to claim as new is:

1. In an engine of the character described, the combination of a normally stationary ball having inlet and exhaust passages therethrough, a cylinder block having a socket fitting said ball, said block gripping said ball but being free to swing on said ball, said ball being angularly adjustable to different stationary positions with respect to the axis of the cylinder block, a piston working in said cylinder block, and a rotary member connected with said piston to be driven by the piston.

2. In an engine of the character described, the combination of a normally stationary ball having inlet and exhaust passages therethrough, means for supporting said ball in its operative position, a cylinder block having a socket fitting said ball, said block including a head split transversely and the sections thereof being adjustably secured together and gripping the ball while permitting the block to swing freely on said ball and enabling the ball and said cylinder block to have a relatively rotative adjusting movement around the axis of said cylinder, a piston working in said cylinder block, and a rotary member connected with said piston to be driven thereby.

3. In an engine of the character described, the combination of a normally stationary ball having inlet and exhaust passages therethrough, means for supporting said ball in its operative position, a cylinder block having a socket fitting said ball, said block gripping the ball but being free to swing thereon, a piston working in the cylinder in said cylinder block, said block being supported solely by said ball and piston and being free to swing relatively to said ball and around its own axis, said ball being angularly adjustable to different stationary positions with respect to the axis of the cylinder block and a rotary member connected with said piston to be driven thereby.

4. In an engine of the character described, the combination of a normally stationary ball having inlet and exhaust passages therethrough, means for supporting said ball in its operative position, a cylinder block having a socket fitting said ball, said block gripping the ball but being free to swing thereon, a piston working in the cylinder in said block, the center of said ball being in line with the axis of said cylinder, and means operable to adjust said ball around said axis.

5. In an engine of the character described, the combination of a normally stationary ball having inlet and exhaust passages therethrough, a cylinder block having a socket fitting said ball, said block gripping the ball but being free to swing thereon, a piston working in the cylinder in said block, the center of said ball being in line with the axis of said cylinder when the cylinder is in its dead center position, means supporting said ball in its operative position and for adjustment around said axis, said inlet and exhaust passages opening on to the bearing surface of said ball at diametrically opposite sides thereof, means for adjusting said ball around said axis and for holding the ball in various positions of adjustment, and a rotary member connected with said piston to be driven thereby.

6. In an engine of the character described, the combination of a normally stationary ball having inlet and exhaust passages therethrough, a cylinder block having a socket fitting said ball, said block gripping said ball but being free to swing on said ball and to rotate around its own axis, means for supporting said ball in its operative position and for adjustment around the axis of the cylinder in said block, means for holding said ball in different positions of adjustment, a piston working in said cylinder, and a rotary member connected with said piston to be driven by the piston.

SAMUEL ELIOT.